Oct. 25, 1927.

L. B. SWIFT 1,646,940

RECORDING MECHANISM

Filed Aug. 25, 1925

Inventor
Lewis B. Swift

By
his Attorney

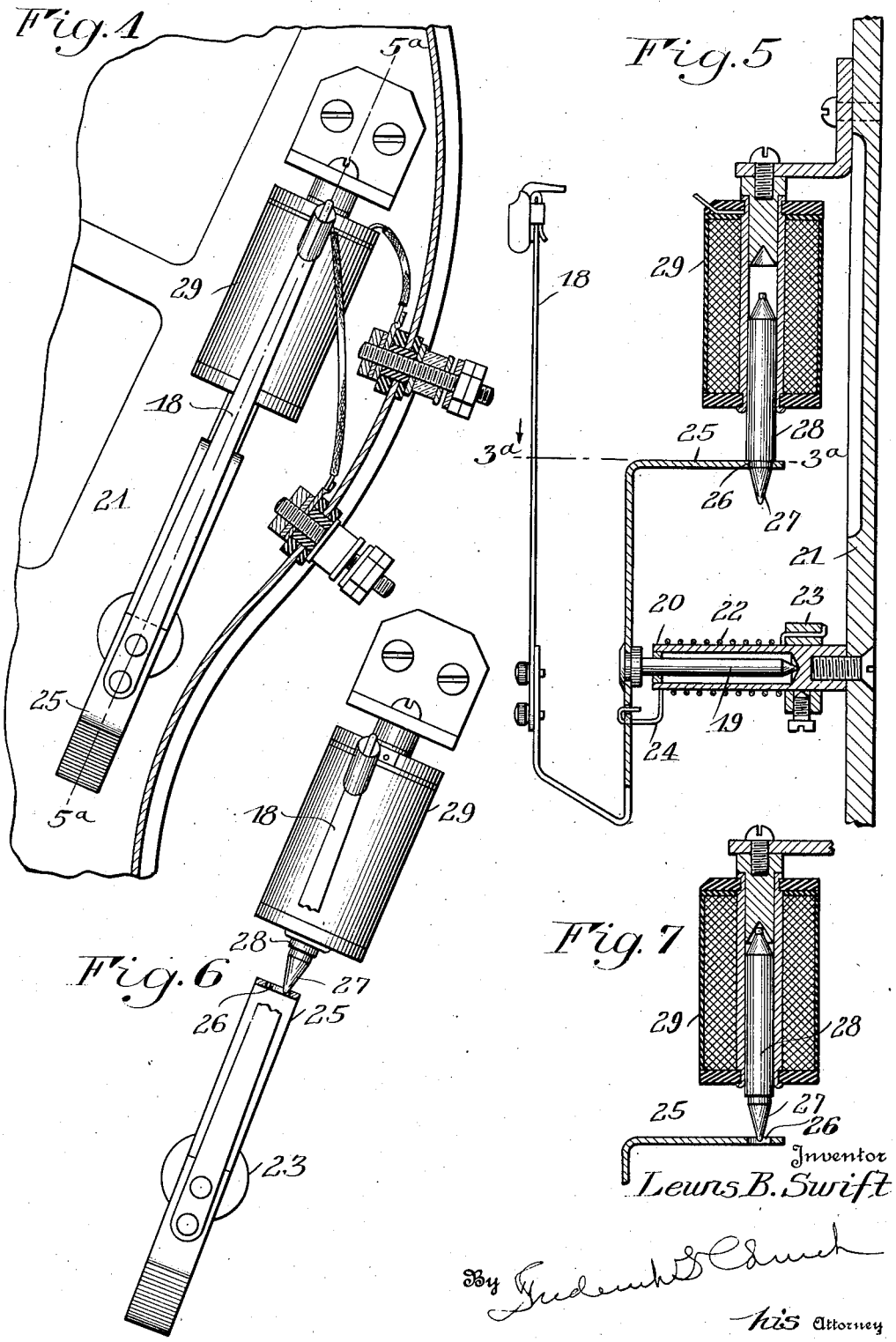

Patented Oct. 25, 1927.

1,646,940

UNITED STATES PATENT OFFICE.

LEWIS B. SWIFT, OF ROCHESTER, NEW YORK, ASSIGNOR TO TAYLOR INSTRUMENT COMPANIES, OF ROCHESTER, NEW YORK, A CORPORATION OF NEW YORK.

RECORDING MECHANISM.

Application filed August 25, 1925. Serial No. 52,306.

My invention relates to recording mechanism, of the variety, for example, adapted for use with a processing container, for recording conditions within the same, the chief object of the invention being to provide a mechanism of this character adapted, for example, to record the temperature of a liquid in a container and also variations in the level of such liquid, both records being preferably made on the same chart for comparative reference. More specifically stated, it is an object of the invention to provide such a mechanism suitable for use, for instance, with a Pasteurizer vat for recording the temperature of the milk and in connection therewith also the times at which the vat is emptied and filled, for the purpose of affording a full record indication of the manner of operation of the vat.

To these and other ends the invention resides in certain improvements and combination of parts, all as will be hereinafter more fully described, the novel features being pointed out in the claims at the end of the specification.

In the drawings:

Figure 4 is an enlarged fragmentary view of an auxiliary pen arm and solenoid actuating means therefor in the recorder casing, the latter being shown in sections.

Figure 5 is a sectional view of the same on the line 5ª—5ª in Figure 4.

Figure 6 is an elevation of the same showing the parts in a different position; and Figure 7 is a sectional view of the solenoid means of Figure 5 with the parts in the position shown in Figure 6.

Similar reference numerals throughout the several views indicate the same parts.

Figure 1:
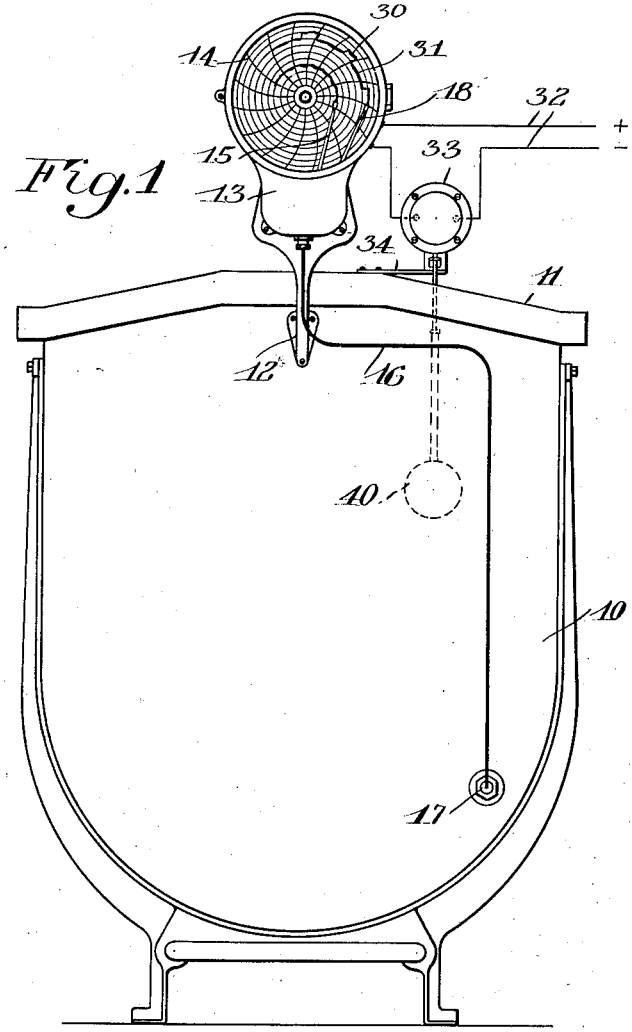
Figure 1 is an elevation of a Pasteurizer vat having a recording mechanism applied thereto embodying the present invention.
Figure 2:
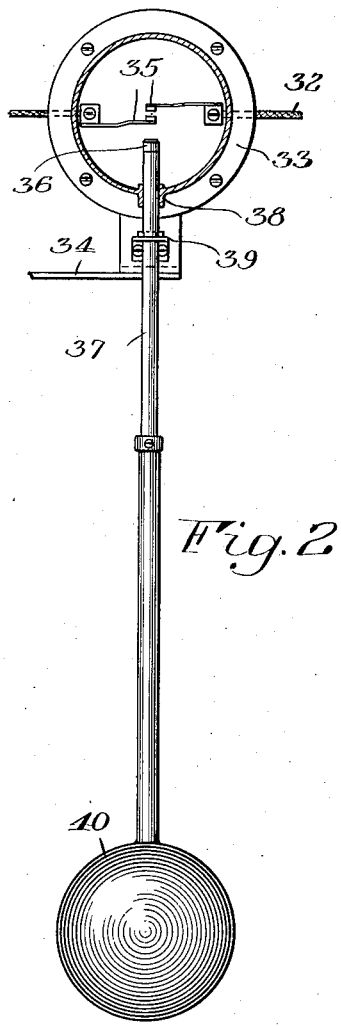
Figure 2 is an enlarged view of float and switch means shown in Figure 1, partly in section.
Figure 3:
Figure 3 is a sectional view of a detail taken on the line 3ª—3ª in Figure 5.

The invention is shown in the present instance, by way of illustration, as applied to the recording of the operating conditions in a Pasteurizer vat, although it will be understood that the invention is applicable as well to various other purposes and in conjunction with other apparatus. In the operation of a Pasteurizer vat of the well-known variety it is desirable that the vat be filled, subjected to heat at a given temperature for a given period, and then emptied and re-filled to repeat the operation, to thus subject all portions of the milk to the proper Pasteurizing treatment, as would not be accomplished, for example, were the mill allowed to flow continuously through the vat. The present invention accordingly provides a mechanism for affording a continuous record of the temperature in the vat and of the filling and emptying of the same, both on the same chart, which thus supplies in convenient form a complete and accurate check on the operation of the apparatus.

Referring more particularly to the drawings, there is shown at 10 a Pasteurizer vat of known construction having a cover 11. Suitable piping connections (not shown) may be provided, of course, for supplying milk to and discharging the same from the vat, as well understood in the art. The recording mechanism in the present embodiment is mounted on the vat as by means of a bracket 12. This mechanism may be of any known or suitable variety of temperature recording instrument, having a time driven chart, the instrument herein shown having a construction such as shown, for example, in the patent to Hodgkinson No. 1,063,349. This instrument comprises a casing 13 secured to the upper end of bracket 12 and within which is the time driven rotary chart 14. A main temperature recording pen arm 15 is moved over the chart by temperature sensitive means within the casing such as described in said Letters Patent, comprising a capillary connection 16 with a bulb 17 inserted through the wall of the vat and located in the body of liquid therein. Such mechanism, as well known in the art, produces a continuous record on chart 14 of the temperature of the contents of the vat.

The present invention provides in combination with a recording mechanism of the above type, an auxiliary pen arm 18 supported and actuated by means within the recorder casing under control of a float in the vat for supplying an additional record on said chart of variations in the level of the liquid in the vat.

The auxiliary pen arm 18 is shown in Figures 4, 5 and 6 as pivotally supported by means of a spindle 19 rotatably mounted at any suitable manner in a post 20 fixed on the rear wall 21 of the casing. A spring 22 coiled about the post and adjustably secured thereto at one end by means of the attached collar 23, has its other end 24 attached to a portion of the pen arm to swing the same in one direction. The pen arm is extended angularly beyond its pivot as at 25 and this extension has a portion formed for engagement and actuation in the other direction by the movable armature controlled by the float, as hereafter described. Preferably the pen arm extension has a socket 26 formed therein, Figure 7, with which engages the pointed lower end 27 of an armature bar 28, the upper portion of which is vertically slidable in a solenoid coil 29. It is apparent from this construction, as illustrated in Figures 5 and 7, that when the solenoid is de-energized, as in Figure 5, armature 28 drops until its conical lower end is seated in recess 26 of the pen arm during which movement the weight of the solenoid swings the pen arm so that its marking element is moved toward the periphery of the chart, as shown, for example, at 30, Figure 1. When the solenoid is energized, however, as in Figure 7, the armature 28 is lifted and spring 22 returns the pen arm in the opposite direction until it is stopped by engagement of an edge of recess 26 with the point 27 of the armature. This movement is sufficient to move the marking element to position 31 on the chart, the positions indicated at 30 and 31 representing respectively empty and full conditions of the vat.

Solenoid 29 is connected with a suitable source of power by conductors 32, Figure 1, one of which preferably includes a switch 33 mounted on a bracket 34 on the vat cover. This switch comprises flexible, normally open contacts 35, the lower of which is adapted to be raised to close the circuit and energize the solenoid by the upper end 36 of a rod 37 sliding vertically in a bearing 38 in the switch casing and in a bracket 39. The rod is preferably constructed in telescopically adjustable sections for the purpose of varying its length and thus adjusting the height of a float 40 on its lower end. This float is thus adapted to be located adjacent the level of the milk or other liquid when the vat is full. That is to say, as the vat is completely filled the float is raised, closing switch contacts 35 and energizing the solenoid to permit the auxiliary pen arm 18 to be swung inwardly to the position indicated at 31 on the chart. This position of the pen or record indicates a full vat. At the end of the holding period, when the vat is emptied, the float falls, opening switch 33 and de-energizing the solenoid, so that the pen of arm 18 is thrown outwardly to position 30 to indicate the emptying of the vat.

The invention thus provides a simple, compact and self-contained recording mechanism adapted to automatically produce a continuous record, showing upon the same chart or time scale, both the temperature of the vat and the times at which the vat was filled and emptied. Such a record affords a complete and accurate check upon the operation of the vat as an assurance that the desired process has been properly carried out.

I claim as my invention:

1. In apparatus of the class described, the combination with a support, of a pen arm, means for pivotally supporting it on the support, spring means tending to move the arm in one direction and means for moving the arm against the action of the spring means, including an element supported on the said support for movement relatively to the arm and means on the latter and on the element for effecting movement of the arm when the said element is moved in one direction, and means for controlling the movement of said element.

2. Apparatus according to claim 1, wherein the arm has a perforation and the said element has a tapered portion for co-operation therewith, the range of movement of said element being limited to maintain the tapered portion within the confines of the perforation.

3. The combination with a recording instrument having a movable chart and a pen arm co-operating therewith, of a separate pen arm, a pivotal support therefor, means for attaching the pivotal support to the casing of the instrument, a solenoid having an armature, means for attaching the solenoid to the casing of the instrument, the separate pen arm having a perforation and the armature having a tapered portion for co-operation therewith.

LEWIS B. SWIFT.